United States Patent
Terai et al.

(10) Patent No.: US 8,135,489 B2
(45) Date of Patent: Mar. 13, 2012

(54) KNIT SIMULATION DEVICE, KNIT SIMULATION METHOD, AND PROGRAM THEREOF

(75) Inventors: Koichi Terai, Wakayama (JP); Tetsuya Fukuda, Wakayama (JP)

(73) Assignee: Shima Seiki Manufacturing, Ltd., Wakayama-shi, Wakayama (JP)

( * ) Notice: Subject to any disclaimer, the term of this patent is extended or adjusted under 35 U.S.C. 154(b) by 1160 days.

(21) Appl. No.: 11/913,854

(22) PCT Filed: May 19, 2006

(86) PCT No.: PCT/JP2006/310010
§ 371 (c)(1),
(2), (4) Date: Nov. 8, 2007

(87) PCT Pub. No.: WO2006/126453
PCT Pub. Date: Nov. 30, 2006

(65) Prior Publication Data
US 2009/0082898 A1   Mar. 26, 2009

(30) Foreign Application Priority Data
May 27, 2005 (JP) .................................. 2005-155981

(51) Int. Cl.
G06F 19/00 (2011.01)
(52) U.S. Cl. ......................................... 700/141; 66/232
(58) Field of Classification Search .................. 700/130, 700/131, 132, 135, 140, 141; 66/232, 237
See application file for complete search history.

(56) References Cited

U.S. PATENT DOCUMENTS

| | | | | |
|---|---|---|---|---|
| 5,719,777 A * | 2/1998 | Kotaki | ........................... | 700/131 |
| 5,812,110 A * | 9/1998 | Kawasaki et al. | ............. | 715/209 |
| 6,611,730 B1 * | 8/2003 | Stoll et al. | ..................... | 700/131 |
| 6,880,367 B2 * | 4/2005 | Suzuki | ........................... | 66/232 |
| 7,127,321 B2 * | 10/2006 | Kenji et al. | ................... | 700/141 |
| 7,289,870 B2 * | 10/2007 | Manabu | ........................ | 700/141 |
| 7,386,360 B2 * | 6/2008 | Noriyuki | ....................... | 700/131 |
| 7,493,245 B2 * | 2/2009 | Suzuki | ............................. | 703/6 |
| 7,738,990 B2 * | 6/2010 | Furukawa et al. | ............. | 700/141 |

(Continued)

FOREIGN PATENT DOCUMENTS
JP    2656405 B2    3/1993

(Continued)

OTHER PUBLICATIONS
Yukari Imazu et al., "Amimono Sosa to Kigo Hyogen to Sono Kashika eno Oyo", Transactions of Information Processing Society of Japan, Mar. 10, 1998, vol. 39, No. 3, pp. 610-617.

(Continued)

*Primary Examiner* — Larry Worrell, Jr.
(74) *Attorney, Agent, or Firm* — Rothwell, Figg, Ernst & Manbeck, P.C.

(57) ABSTRACT

The presence or absence of putting round of a yarn is detected according to whether carriers are positioned on a near side or a far side and according to the relationship of connection between loops, and the result is displayed on a monitor. On the monitor, for example, the degree of the deformation of the yarn is changed according to the presence or absence of putting round when the yarn is touched, or a color is changed according to the presence or absence of putting round. The presence or absence of putting round of the yarn can be detected and then displayed to a user.

11 Claims, 7 Drawing Sheets

U.S. PATENT DOCUMENTS

| | | | |
|---|---|---|---|
| 2007/0156277 A1* | 7/2007 | Suzuki | 700/141 |
| 2009/0082898 A1* | 3/2009 | Terai et al. | 700/141 |
| 2010/0145495 A1* | 6/2010 | Terai | 700/141 |

FOREIGN PATENT DOCUMENTS

| | | |
|---|---|---|
| JP | 2631946 B2 | 3/1995 |
| JP | 9-212664 A | 8/1997 |
| JP | 2000-27055 A | 1/2000 |

OTHER PUBLICATIONS

Masayuki Yamada et al., "Ayatori ni Okeru Himo Zukei Henkan Katei no Hyogen to Sono Shori", Transactions of Information Processing Society of Japan, Mar. 15, 1994, vol. 35, No. 3, pp. 497 to 504.

* cited by examiner

KNIT SIMULATION DEVICE, KNIT SIMULATION METHOD, AND PROGRAM THEREOF

CROSS REFERENCE TO RELATED APPLICATION

This application is a 35 U.S.C. 371 National Phase Entry Application from PCT/JP2006/310010 filed May 19, 2006, which claims the benefit of Japanese Patent Application No. 2005-155981 filed on May 27, 2005, the disclosure of which is incorporated herein in its entirety by reference.

TECHNICAL FIELD

The present invention relates to knit simulation, and particularly to simulating and displaying the presence or absence of putting round of yarn.

BACKGROUND ART

The applicant has proposed converting knit data of a knitted fabric to an image of the knitted fabric to display [the image] on a color monitor or a color printer (Japanese Patent Application No. 2631946). Incidentally, in a knitted fabric in which a plurality of yarns are used, there is a case in which one yarn rolls up another yarn (FIG. 9) and a case in which it does not roll up (FIG. 10). In the case in which a yarn is put round, two sections on the knitted fabric are connected to each other. On the other hand, in the case in which the yarn is not put round, the connection between the two sections is weak, and, for example, a central part between the two sections is independent of the right and left sections as shown in FIG. 10 and thereby can be lifted up or moved to the right or left. However, as far as the applicant knows, the conventional knit design apparatus is not designed to simulate putting round of yarns.

DISCLOSURE OF THE INVENTION

An object of the present invention is to make it possible to confirm the presence or absence of putting round of yarns by performing simulation.

Another object of the present invention is to provide a specific method for determining whether a yarn is put round or not.

Yet another object of the present invention is to provide an optimal method for determining whether a yarn is put round or not.

A further object of the present invention is to allow a user to visually and easily discriminate whether a yarn is put round or not.

A knit simulation device of the present invention is a device for simulating on knit data a result of knitting performed using knit data for a flat-knitting machine having at least a pair of needle beds and carriers that respectively feed yarns to needles of the needle beds and move upper portions of the needle beds in parallel with the needle beds, wherein, when a new knitted loop is formed by the needle of one of the needle beds using a first yarn fed from a first carrier of a plurality of carriers in an area on a knitted fabric in which separate knitted loops are formed by separate yarns fed respectively from the plurality of carriers, in order to determine whether another yarn fed from another carrier out of the plurality of carriers is put round or not, the knit simulation device has: identifying means for obtaining a near side/far side relationship between the first carrier and the other carrier as seen from the one of the needle beds; and determining means for determining, based on the obtained near side/far side relationship and an order of knitting in the knitted fabric area, whether the other yarn is put round or not.

A knit simulation method of the present invention is a method for simulating on knit data a result of knitting performed using knit data for a flat-knitting machine having at least a pair of needle beds and carriers that respectively feed yarns to needles of the needle beds and move upper portions of the needle beds in parallel with the needle beds, wherein, when a new knitted loop is formed by the needle of one of the needle beds using a first yarn fed from a first carrier of a plurality of carriers in an area on a knitted fabric in which separate knitted loops are formed by separate yarns fed respectively from the plurality of carriers, in order to determine whether another yarn fed from another carrier out of the plurality of carriers is put round or not, the knit simulation method has: an identifying step of obtaining a near side/far side relationship between the first carrier and the other carrier as seen from the one of the needle beds; and a determining step of determining, based on the obtained near side/far side relationship and an order of knitting in the knitted fabric area, whether the other yarn is put round or not.

A knit simulation program of the present invention is a program for simulating on knit data a result of knitting performed using knit data for a flat-knitting machine having at least a pair of needle beds and carriers that respectively feed yarns to needles of the needle beds and move upper portions of the needle beds in parallel with the needle beds, wherein, when a new knitted loop is formed by the needle of one of the needle beds using a first yarn fed from a first carrier of a plurality of carriers in an area on a knitted fabric in which separate knitted loops are formed by separate yarns fed respectively from the plurality of carriers, in order to determine whether another yarn fed from another carrier out of the plurality of carriers is put round or not, the knit simulation program has: an identifying instruction for obtaining a near side/far side relationship between the first carrier and the other carrier as seen from the one of the needle beds; and a determining instruction for determining, based on the obtained near side/far side relationship and an order of knitting in the knitted fabric area, whether the other yarn is put round or not.

In the determination described above, preferably it is determined that the other yarn is put round when, at a position of a knitted loop which is a just previously knitted loop and formed by the first yarn, the other yarn is missed after the one previous knitted loop is formed, and when the missed yarn is located farther than the one previous knitted loop as seen from the one of the needle beds and the first carrier is located farther than the other carrier as seen from the one of the needle beds according to the positional relationship between the carriers which is obtained by the identifying means.

More preferably, in the determination described above, when the new knitted loop is the first knitted loop of a new knitting course which is related to the first yarn fed from the first carrier, it is determined whether there is putting round of a yarn.

Especially preferably, a color monitor for displaying an image of the knitted fabric obtained in the simulation is provided, and a mark is applied onto the color monitor or movably displayed independently of the missed yarn located in the position of the one previous knitted loop, so that the user can identify the presence or absence of putting round.

In the present specification, descriptions related to the knit simulation device apply to the knit simulation method and the knit simulation program unless otherwise specified. Similarly, descriptions related to the knit simulation method apply to the knit simulation device and the knit simulation program unless otherwise specified.

In the present invention, the presence or absence of putting round of a yarn is determined by using at least the near side/far side relationship between the carrier used for the new knitted loop and the other carrier for feeding a yarn in the same area. Which one of the carriers exists on the near side or the far side is a basic condition for determining the presence or absence of putting round, and some other conditions are added depending on the type of knitting. If there is no putting round, the yarns fed from the plurality of carriers are independent of one other, thus no connection is formed in this section of the knitted fabric. On the other hand, if putting round is present, the yarns fed from the plurality of carriers are coupled to one another, thus the knitted fabric is connected. Therefore, in the present invention, the presence or absence of putting round is simulated so that the presence or absence of a connection between yarns can be determined even in an area where the plurality of carriers are used.

In intarsia jacquard or jacquard, yarns are fed in parallel from the plurality of carriers, wherein one of the yarns is knitted and another yarn is missed to thereby form a pattern. In this case, a knitted loop which is one below the new knitted loop or another knitted loop which is one through several knitted loops away from the new knitted loop to the right and left is important. When the yarn that is the same as that of the new knitted loop is knitted at these positions and the other yarn is missed at these positions, putting round can occur. In order to generate putting round, it is necessary that:

1) After the just previously knitted loop is formed by the yarn same as that of the new knitted loop, the other yarn is missed at this position and the missed yarn is located farther than the knitted loop; and
2) The carrier for forming the new knitted loop is located farther than the carrier of the missed yarn. Here, the near side/far side relationship is defined by a direction in which an opposite needle bed is viewed from a needle bed having a needle for forming knitted loops. Accordingly, simulation can be performed as to whether the boundary between the right and left sides of the intarsia jacquard pattern or the jacquard pattern is connected or not.

It should be noted that putting round is generated when the new knitted loop, for example, is the first knitted loop of a new knitting course which is related to the first yarn fed from the first carrier, thus determination on the presence or absence of putting round regarding the other knitted loop may not be performed.

The presence or absence of putting round may be outputed with a character, a symbol or the like, but the presence or absence of putting round can be found easily by displaying a simulation image on the color monitor and changing the brightness, chroma, color phase or other color data of a section of the image related to the presence or absence of putting round, or by applying a net-like mark on the relevant section. Also, the user may be allowed to specify the relevant section by means of a mouse or a stylus on the color monitor so that, when this section is specified and moved, sections that move simultaneously may be varied according to the case where the putting round of a yarn is present and the case where it is not present. In this manner, the user can visually and easily confirm the presence or absence of putting round.

Figure 1:
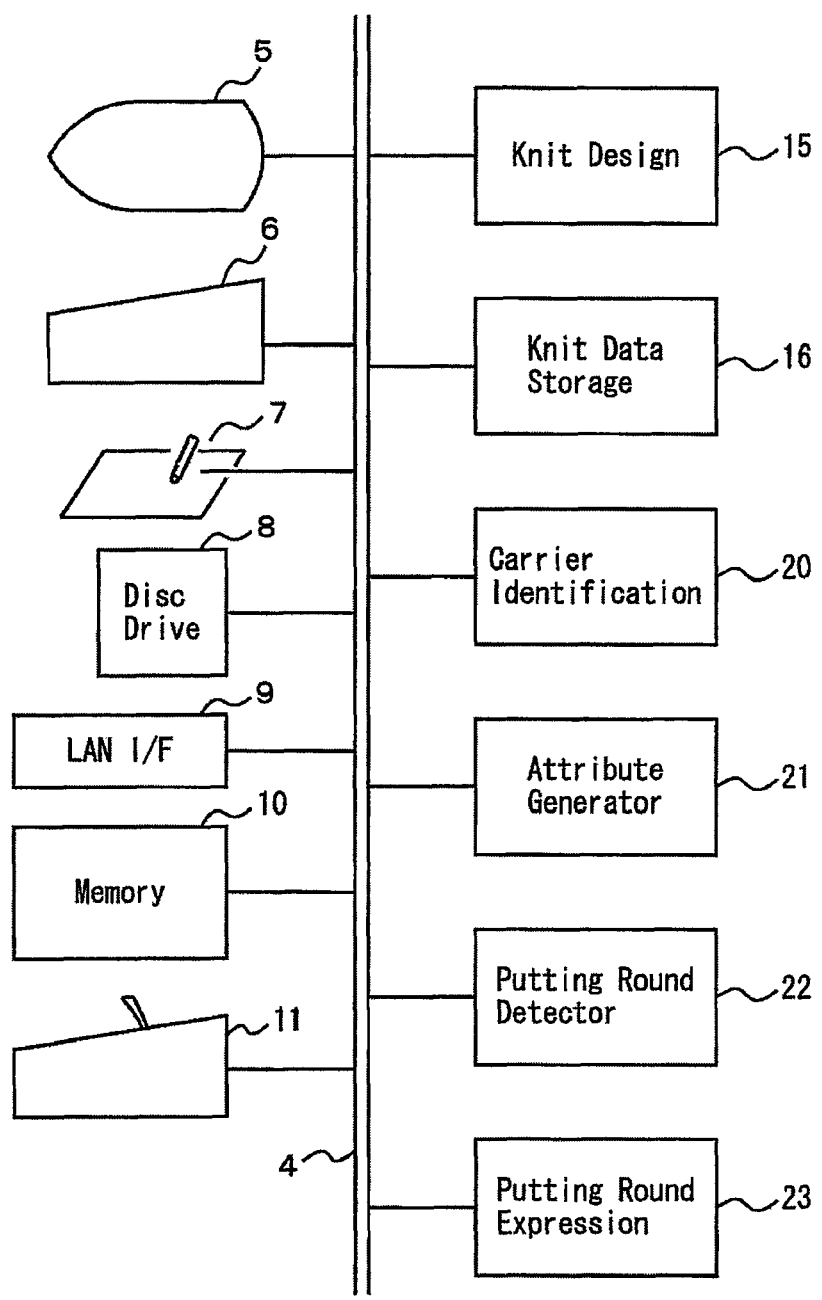
FIG. 1 is a block diagram of a knit simulation device of an embodiment.

EXPLANATION OF REFERENCE NUMERALS 2 knit simulation device
4 bus
5 color monitor
6 keyboard
7 stylus
8 disc drive
9 LAN interface
10 memory
11 color printer
15 knit design
16 knit data storage
20 carrier identification
21 attribute generator
22 putting round detector
23 putting round expression
30 knit simulation program
31 knit simulation instruction
32 carrier position identification instruction
33 putting round determination instruction
34 putting round display instruction
35 color identification instruction
36 operation/deformation instruction
40 flat-knitting machine
42 front needle bed
43 back needle bed
44 carrier rail
45, 46 carrier
48 needle
50 knitted fabric
52 stitch
53 miss stitch
54 one previously knitted stitch
55 stitch
56 putting round portion
60, 61 yarn
62, 63 stitches 64 miss stitch
65 stitch
66 putting round portion
70, 72 jacquard course
73, 74 course
80 end portion area
81 row of stitches formed by the front bed
82 row of stitches formed by the back bed
83 one previously knitted stitch
F carrier on near side
B carrier on far side
N needle loop
S sinker loop

BEST MODE FOR CARRYING OUT THE INVENTION

Hereinafter, the best mode for carrying out the present invention is described.

Embodiment

FIG. 1 through FIG. 13 show the embodiment. In these figures, reference numeral 2 represents a knit simulation device; reference numeral 4 represents a bus; reference numeral 5 represents a color monitor; and reference numeral 7 represents a stylus indicating a coordinate on the color monitor 5, and a mouse, a track ball, a joystick or the like may be used in place of the stylus 7. Reference numeral 8 representing a disc drive and reference numeral 9 representing a LAN interface are for inputting/outputting a knit simulation program, pattern data, knit data and the like. Reference numeral 10 representing a memory is for storing the knit simulation program and the like and storing various data or simulation images obtained during a work. Reference numeral 11 representing a color printer is for outputting a knit simulation image, as with the monitor 5.

A knit design 15 creates knit design data from an input obtained from the keyboard 6, stylus 7 or the like, and converts the knit design data to knit data to be used in a flat-knitting machine. A knit data storage 16 stores the created knit data. A carrier identification 20 for determining the presence or absence of putting round of a yarn is provided to specify a carrier number for a carrier required for executing the knitting data. As in the conventional knit simulation device, if a simulation is performed without specifying a carrier number and without specifying the near side/far side relationship between the carriers, the presence or absence of putting round of a yarn cannot be determined. Therefore, in the case in which a carrier number is already specified within the knitting data, this carrier number is used as is. If a carrier number is not specified, the user is requested to specify a carrier number by means of the color monitor 5 or the like, and the value specified from the keyboard 6 or the like is taken as the carrier number.

An attribute provider 21 specifies attributes of each knitted loop (stitch) in the knitted data for the knitted loop, and the attributes include, for example, whether each knitted loop is a face stitch or a back stitch, the type of the knitted loop whether it is a knit stitch, a tuck stitch or a miss stitch, the number of the own knitted loop, the numbers of respective knitted loops on the right and left, and the numbers of respective processing steps. For example, the numbers of the respective knitted loops are provided in the order in which the knitted loops are formed, and the numbers of respective processing steps are counted every time when forming a knitted loop or transferring a knitted loop, and are provided in the same order as the numbers of respective knitted loops if a knitted loop is not transferred. If a knitted loop is transferred, a knitted loop, which is formed first and transferred later, is assigned with a processing step number corresponding to the transfer and larger than those of the loops before the transfer. Furthermore, a missed yarn is formally regarded as a knitted loop and thus is called "miss stitch," and the attributes are specified thereof. When a knitted loop formed as a knit stitch and a missed yarn overlap with each other at the same position, the attributes of the knitted loops can be used to determine which one is closer to the needle beds used in knitting.

For one carrier, the first knitted loop of a new course is applied with one previously knitted loop as an attribute. This applied knitted loop is formed by the same carrier using the same yarn, and located in one previous course in relation to the top and bottom of the knitted fabric, i.e., immediately below the first knitted loop of the new course or on the right or left side thereof.

A yarn putting round detection portion 22 detects the presence or absence of putting round by using the near side/far side relationship among the plurality of carriers and the knitting data. A putting round display portion 23 changes, for example, the color data of an image on the color monitor 5 or the color printer 11 when there is or there is no putting round. Also, a designer, the user, uses the stylus 7 or the like to specify a section of the image on the color monitor 5 where the designer wishes to check the presence or absence of putting round, and allows the specified section to move on the screen. On the other hand, if the specified section is connected by the putting round to another part, the image displayed on the color monitor is caused to move this part simultaneously with the specified section, and if not, the displayed image is caused to not move this part. The presence or absence of putting round may be marked up by displaying other data than the color data. The movement may be performed on the screen so that the knitted fabric on the screen is deformed differently according to the presence or absence of putting round.

Figure 2:
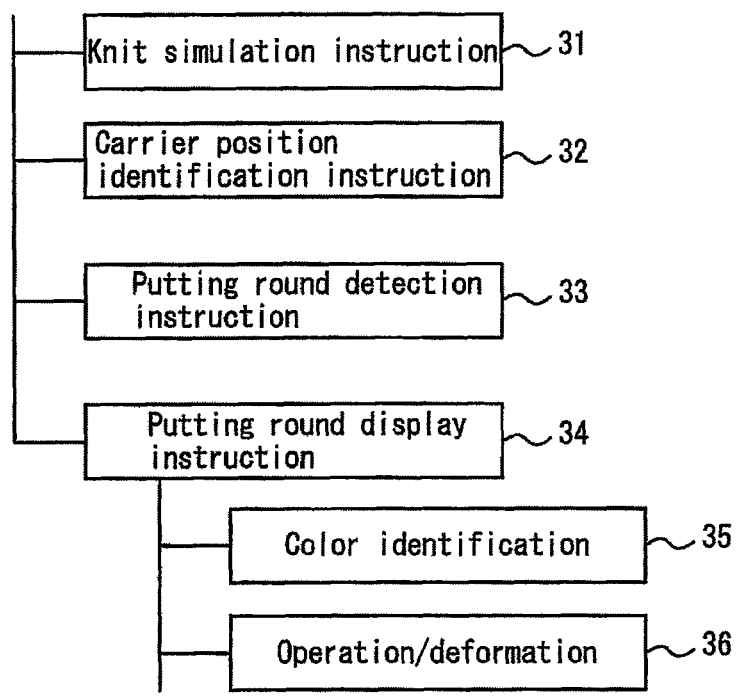
FIG. 2 is a block diagram of a knit simulation program of the embodiment.

A knit simulation program 30 shown in FIG. 2 performs normal knit simulation by means of a knit simulation instruction 31 to convert knitting data to an image of a knitted fabric that is formed according to the knitting data. In this simulation image, the individual loops are expressed by lines of yarns. The knit simulation instruction 31 itself is a instruction provided in a regular knit simulation device. A carrier position identification instruction 32 allocates, according to the knitting data, a carrier number to a carrier required for executing the knitting data, and, if a carrier number is not specified by the knitting data, the user is requested to specify a carrier number. Instead of requesting the user to specify a carrier number, the presence/absence of putting round or other condition is presented to the user, and then a carrier number may be allocated according to a response from the user.

A putting round detection instruction 33 determines the presence or absence of putting round by using the near side/far side positional relationship between the carriers, the order of knitting, and the knitted loop attributes obtained from the knitting data. A putting round display instruction 34 displays the presence or absence of putting round on the color monitor or printer. A color identification instruction 35 is provided to, for example, change the color data of the section based on the presence or absence of putting round. Also, an operation/deformation instruction 36 is provided for changing the degree of deformation in accordance with the presence or absence of putting round when the user specifies and operates the section in question regarding the presence or absence of putting round.

Figure 3:
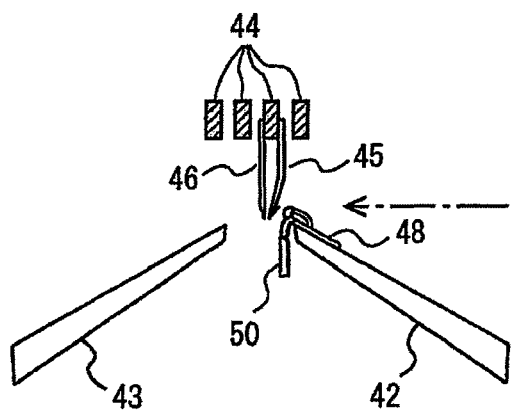
FIG. 3 is a diagram schematically showing a definition of a near side and a far side of carriers in the embodiment.

FIG. 3 shows the near side/far side relationship between carriers 45, 46 in the flat-knitting machine 40. Reference numeral 42 represents a front needle bed, while reference numeral 43 represents a back needle bed, and a needle bed, a transfer bed and the like may be provided above these needle beds. Reference numeral 44 represents a carrier rail, the carriers 45, 46 travel on, for example, the right and left sides of each rail, and yarns are fed from yarn feeders positioned on a lower end of the carrier rails to needles of the needle beds 42, 43. Reference numeral 48 represents a needle of the needle beds, and reference numeral 50 represents a knitted fabric that is being subjected to knitting. When forming a knitted loop with the needle 48 of the needle bed, the near side and the far side of the yarn carriers 45, 46 are defined along a direction of viewing the back needle bed 43 from the needle bed 42. When forming a knitted loop with a needle of the back needle bed 43, on the other hand, the near side and the far side are defined along a direction of viewing the front needle bed 42 from the back needle bed 43. The flat-knitting machine 40 also has a control portion and a carriage, not shown, wherein the knitting data is interpreted by the control portion and the carriage is operated to move the carriers 45, 46 together and to control the needle 48 and the like.

Figure 4:
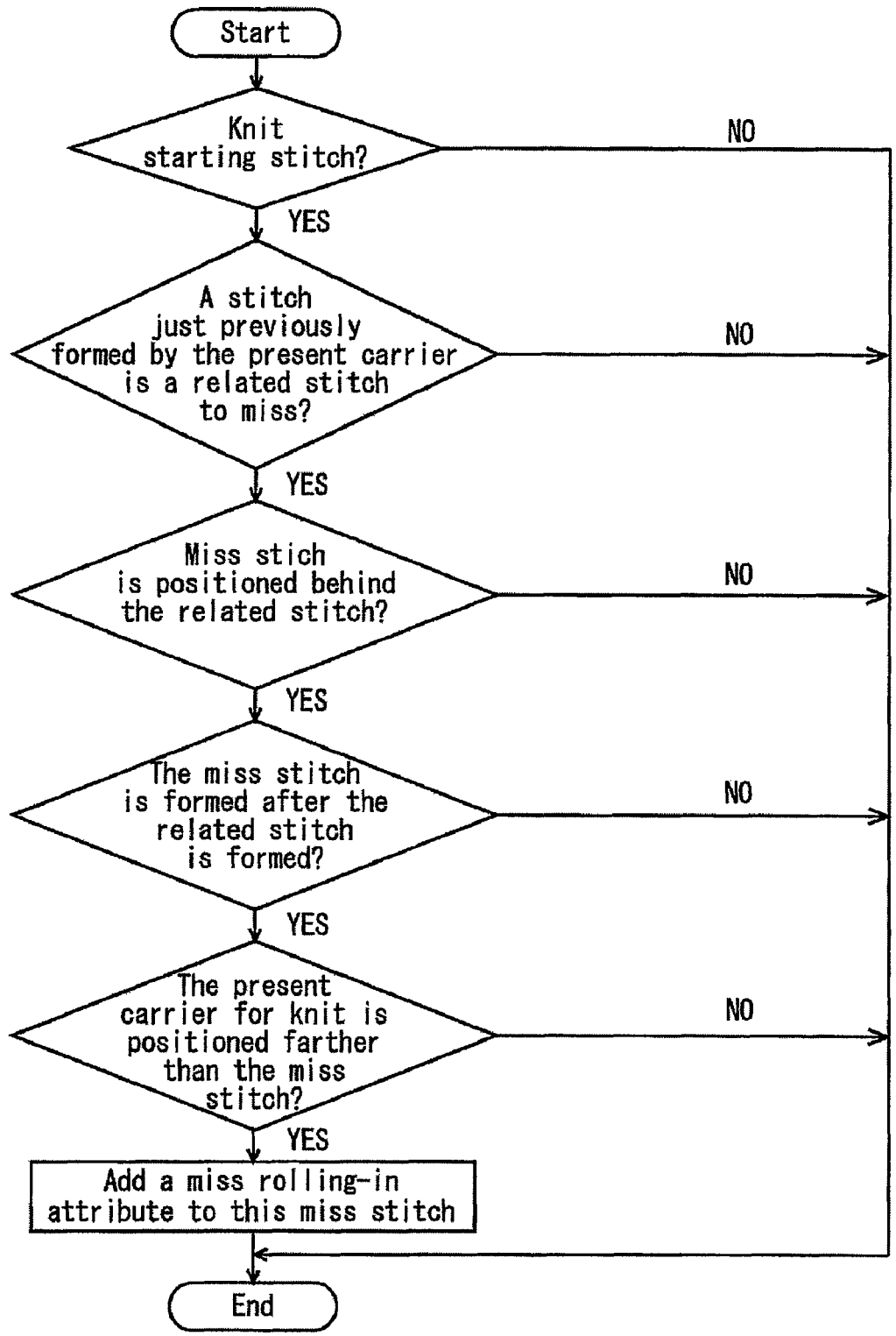
FIG. 4 is a flowchart showing a knit simulation method of the embodiment.

FIG. 4 shows a method for determining the presence or absence of putting round of a yarn in the case of intarsia jacquard or jacquard. Putting round of a yarn occurs at the first knitted loop of a course for each carrier, thus it is determined if a loop is the starting stitch for the knitting of one course. If YES, it is checked if a loop knitted just previously to a stitch to be formed is a stitch related to miss. In other words, it is checked if there exists a missed yarn overlapped with the knitted loop which is formed just previously to the knitted loop to be formed, by the same yarn and by the same carrier as those used to form the knitted loop to be formed. We refer to those knitted loops overlapped with a miss yarn as "related to miss." If YES in this case as well, it is determined if a miss stitch is positioned behind the just previously knitted loop. It should be noted that the miss stitch is a missed yarn formally regarded as a knitted loop. We call the miss stitch farther than the just previously knitted loop from the needle bed forming the new knitted loop a miss stitch behind.

If the miss stitch is behind the just previously knitted loop, it is confirmed if the miss stitch is formed subsequently to the just previously knitted loop. If the miss stitch is formed subsequently to the just previously knitted loop, there might exist putting round, but if the just previously knitted loop is formed subsequently to the miss stitch, the putting round is not produced. If the miss stitch is formed first, the prolongation of the just previously knitted loop formed later is not hidden below the missed yarn. On the other hand, if the one previous knitted loop is formed first, the missed yarn passes above the prolongation of the just previously knitted loop in an intersecting manner, in which case putting round occurs. The missed yarn passes above the prolongation of the just previously knitted loop in an intersecting manner when the just previously knitted loop is located behind the missed yarn and the carrier for the yarn of the just previously knitted loop is located behind the carrier for the missed yarn. Then, it is identified whether the carrier for the yarn for a new knitted loop is located in front of or behind the carrier for the miss stitch, and, if it is located behind the carrier for the miss stitch, the miss stitch is applied with the putting round attribute.

Figure 5:
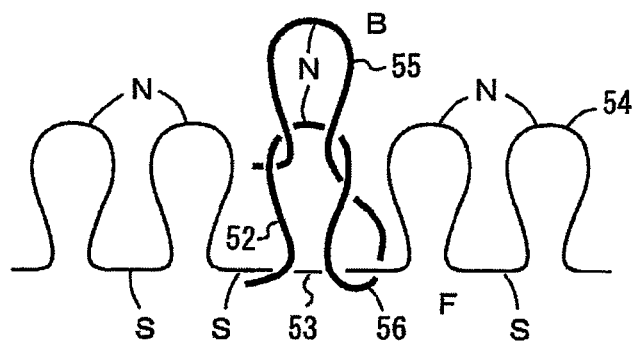
FIG. 5 is a diagram showing an example of catching a miss stitch in intarsia jacquard.
Figure 6:
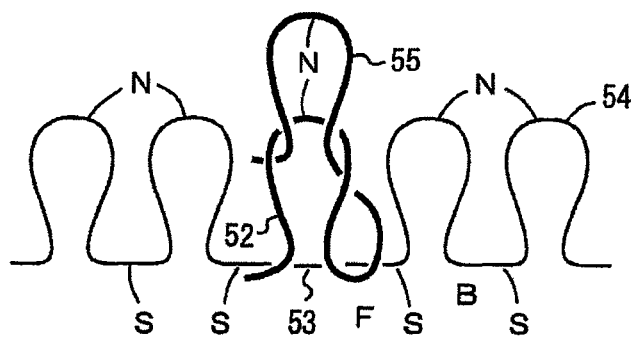
FIG. 6 is a diagram showing an example in which the miss stitch is not put round in intarsia jacquard.

FIG. 5 and FIG. 6 schematically show the presence and absence of putting round. It is assumed that a stitch 55 is formed by the same carrier subsequent to a stitch 52. Reference numeral 53 is a miss stitch, and the stitch 55 is a stitch to be formed. Reference numeral 52 is a knitted loop previous to the knitted loop 55. Alphabets F, B shown in FIG. 5 and FIG. 6 indicate the carriers located on the near side and far side, wherein F represents the carrier on the near side and B represents the carrier on the far side. Also, N represents a needle loop, while S represents a sinker loop, and reference numerals 52 through 55 are the numbers obtained by reducing the knitted loop numbers in the knitted loop attributes.

In FIG. 5, after the stitch 52 is formed by the carrier B, the miss stitch 53 and a knitted loop 54 are formed by the carrier F. The knitted loop 54 is the last knitted loop to be formed in this course, and the carriages stop at this knitted loop. Next, the carrier B is used to form the knitted loop 55. The presence or absence of putting round is determined at this point. In FIG. 6, after the stitch 52 is formed by the carrier F, the miss stitch 53 and the knitted loop 54 are formed by the carrier B. Next, the carrier F is used to form the knitted loop 55. The presence or absence of putting round is determined at this point.

In the case of FIG. 5, the miss stitch 53 corresponds to a stitch behind, since it is located farther than the stitch 52 as seen from the needle bed for knitting the course. The stitch 52 is previously knitted to the knitted loop 55 to be formed and is a target stitch for miss as seen from the miss stitch 53. In this case, when the knitted loop 55 is formed by the carrier B located farther than the miss stitch 53, as shown in FIG. 5, putting round occurs at the sinker loop, as indicated by a putting round portion 56. When the carrier F used for forming the knitted loop 55 is located in front of the carrier B used for forming the miss stitch 53 (FIG. 6), putting round of a yarn does not occur.

Figure 7:
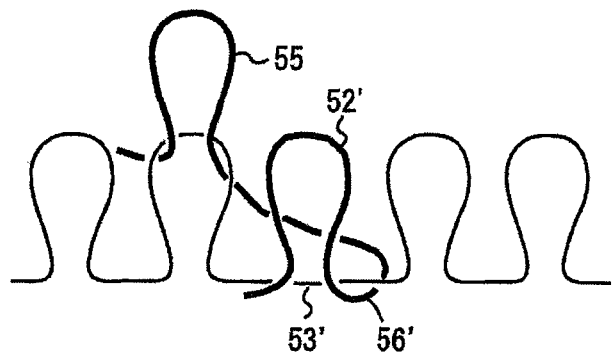
FIG. 7 is a diagram showing an example in which one previous knitted loop is present on the right side blow one course of new knitted loops.
Figure 8:
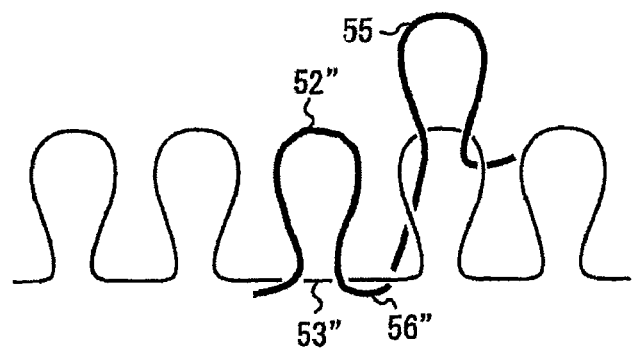
FIG. 8 is a diagram showing an example in which one previous knitted loop is present on the left side blow one course of new knitted loops.

The just previously knitted loop is not necessarily the knitted loop immediately below the new knitted loop. FIG. 7 and FIG. 8 show an example in which the just previously knitted loop is present on the right and left sides of the new knitted loop and putting round is generated. In the drawings, reference numeral 55 represents the new knitted loop, reference numerals 52', 52" each represent the just previously knitted loop, reference numeral 53', 53" each represent the miss stitch, and reference numeral 56', 56" each represent the putting round portion.

Figure 9:
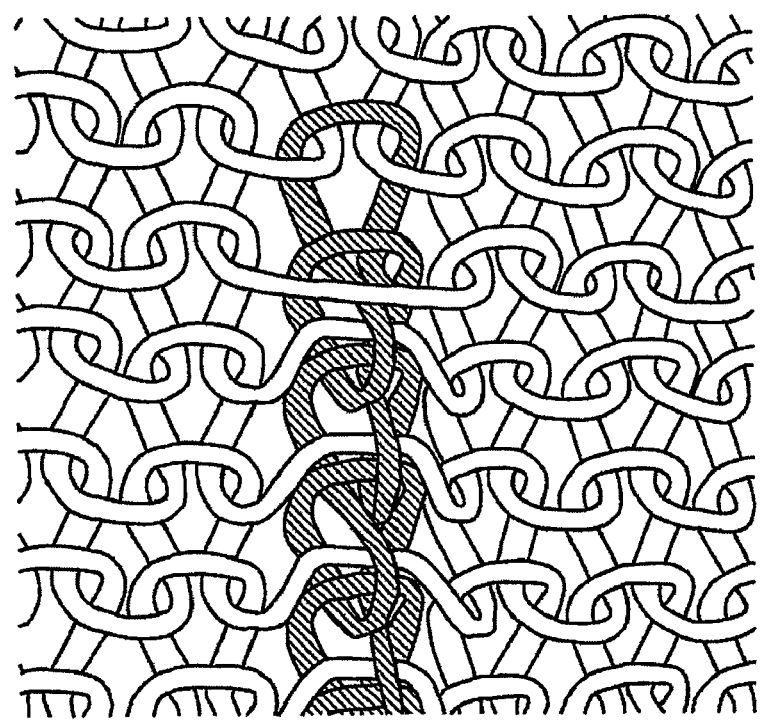
FIG. 9 is a diagram schematically showing a knitted fabric in which the miss stitch is put round in intarsia jacquard.
Figure 10:
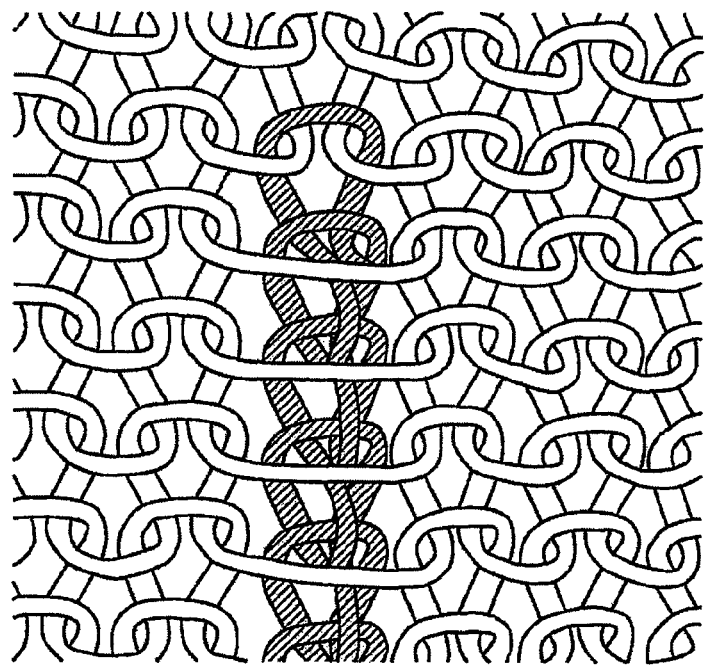
FIG. 10 is a diagram schematically showing a knitted fabric in which the miss stitch is not put round in intarsia jacquard.

FIG. 9 shows an example in which the putting round of a yarn is displayed on the color monitor, and FIG. 10 shows an example where the putting round of a yarn is not displayed. Each of these drawings shows one stitch row width of intarsia jacquard pattern and shows the back of a knitted fabric, wherein plain stitch loops in the middle are formed so as to configure one column. When there is formed putting round as shown in FIG. 9, a missed yarn passes through the spaces between the plain stitch loops at the bottom and center of the Figure connected vertically. Thus, the vertically connected plain stitch loops are knitted together with the entire knitted fabric around the pain stitch loops, forming a steady texture. On the other hand, when there is no putting round, as shown in FIG. 10, the missed yarn passes above the plain stitch loops, and the plain stitch loops in one column are only connected to the surrounding knitted fabric at both upper and lower ends, whereby thus obtained parts protrude in the form of a bridge. The design shown in FIG. 10 is one of the variations of a knitted fabric.

The presence or absence of putting round of a yarn is displayed by changing the color data according to the presence or absence of putting round. Alternatively, when the part in question is specified and dragged by means of the stylus or the like, if putting round is present the surrounding knitted fabric is also moved, and if putting round is not present, only the section is moved independently of the surrounding knitted fabric.

Figure 11:
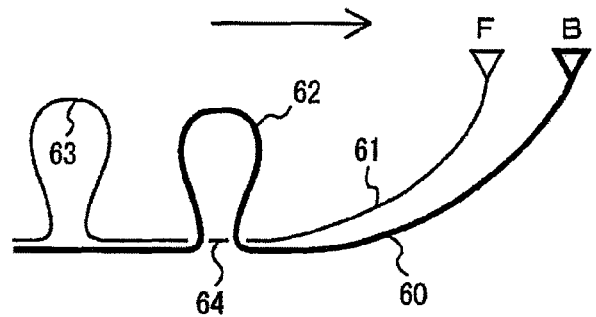
FIG. 11 is a diagram showing an example in which a missed yarn is put round in jacquard.
Figure 11:
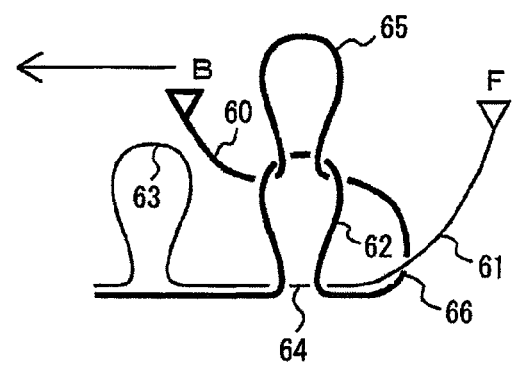
Figure 12:
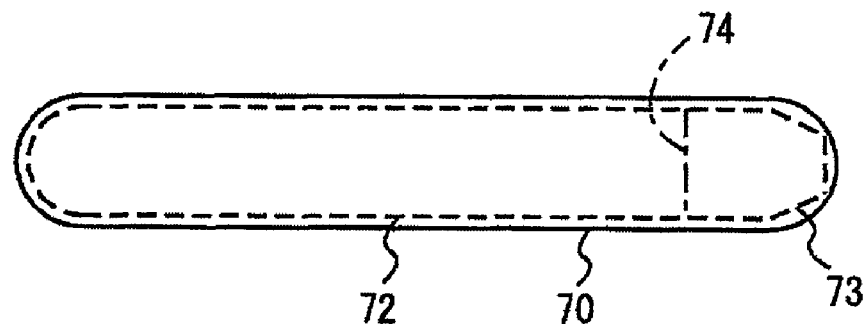
FIG. 12 is a diagram schematically showing an example in which the structure of the knitted fabric is changed by the presence or absence of putting round in two-color jacquard.

Although the above example illustrates intarsia jacquard, the same thing applies to general jacquard such as two-color jacquard. Such an example is shown in FIG. 11 and FIG. 12, wherein reference numerals 60 and 61 each represent a yarn, a knitted loop 63 is formed after a knitted loop 62 is formed, and reference numeral 64 is a miss stitch overlapping with the knitted loop 62. Here, a yarn 60 is used to form a knitted loop 65 above the knitted loop 62. In this case, the knitted loop 65 is the first knitted loop in the course in relation to the carrier feeding the yarn 60, and in this case the knitted loop 62, which is a knitted loop formed just previously to the knitted loop 65, is a stitch related to miss, and the miss stitch 64 is positioned farther than the knitted loop 62. Here, as in the flowchart shown in FIG. 4, if the carrier B that forms the knitted loop 65 is positioned farther the carrier F used for forming the miss stitch 64, a putting round portion 66 is formed, in which case the yarn putting round attribute is added to the miss stitch 64. If the carrier used for forming the knitted loop 65 is positioned in front of the carrier used for forming the miss stitch 64, putting round of a yarn is not generated.

FIG. 12 shows an example of a tubular two-color jacquard knitted fabric, wherein reference numerals 70 and 72 each represent a jacquard course. They become a course 73 if putting round of a yarn is formed at a knitting end as shown in FIG. 12, or become a course 74 if putting round is not formed. A knitted fabric having the course 74 has a smaller inner diameter than other courses and therefore it is difficult to wear this knitted fabric, thus the quality of the knitted fabric varies according to the presence or absence of putting round.

Figure 13:
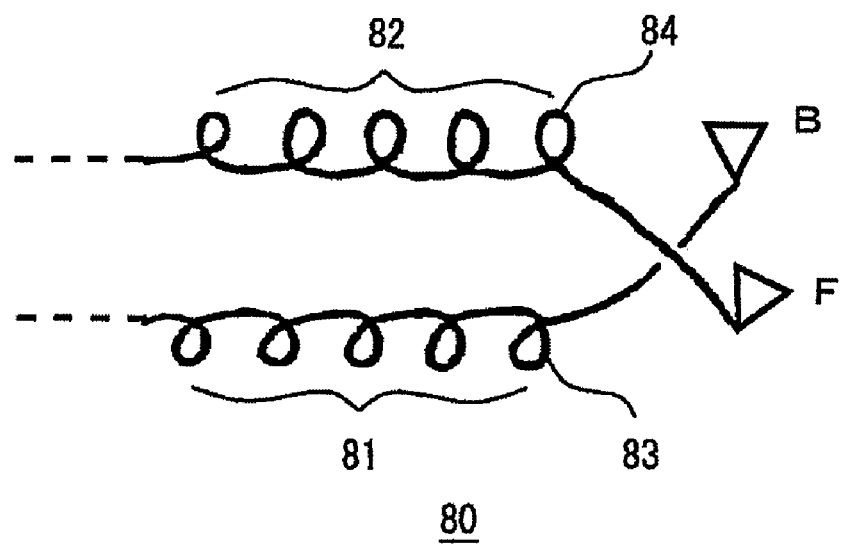
FIG. 13 is a diagram for explaining putting round of a yarn at an end portion of a tubular knitted fabric.

FIG. 13 shows how putting round of yarns is generated at an area 80 located at an end portion of a tubular knitted fabric. Reference numeral 81 represents a row of knitted loops formed by a front bed, a reference numeral 82 represents a row of knitted loops formed by a back bed, and the carrier B on the far side is used to form a new knitted loop following the previous one knitted loop 83. The carrier B is located farther than the carrier F, and a knitted loop 84 is formed after forming the knitted loop 83, thus, when forming a knitted loop subsequent to the previous knitted loop 83, putting round of a yarn is generated. On the other hand, if the carrier F is used to form a knitted loop subsequent to the knitted loop 84, putting round is not generated since the knitted loop 84 is formed subsequent to the knitted loop 83.

In this embodiment, as described above, the presence or absence of putting round can be determined, the result thereof can be displayed to the user, and the user can confirm from the result whether the intended design is obtained. Since the quality of the knitted fabric changes significantly according to the presence or absence of putting round, the present invention is important. A designer can conform via the monitor whether, for example, the designer has designed a pattern protruding from the surrounding knitted fabric or has designed a knitted fabric fixed to the surrounding knitted fabric at the end portions of the courses.

The invention claimed is:

1. A knit simulation device for simulating a result of knitting operations performed on knit data for a flat-knitting machine having at least a pair of needle beds and carriers that respectively feed yarns to needles of the needle beds and move upper portions of the needle beds in parallel with the needle beds, wherein, when a new knitted loop is formed by a needle of one of the needle beds using a first yarn fed from a first carrier of the carriers in an area on a knitted fabric in which separate knitted loops are formed by separate yarns fed respectively from the carriers, in order to determine whether a second yarn fed from a second carrier out of the carriers is put round or not, the knit simulation device comprises:

identifying means for obtaining a relationship between a near and a far side of the first carrier and the second carrier as seen from said one of the needle beds; and determining means for determining, based on said obtained relationship and an order of knitting in the knitted fabric area, whether the other yarn is put round.

2. The knit simulation device according to claim 1, wherein the determining means determines that the second yarn is put round when, at a position of a just previously knitted loop, the second yarn is missed after the just previously knitted loop is formed, and when the missed yarn is located farther than the just previously knitted loop as seen from said one of the needle beds and the first carrier is located farther than the second carrier as seen from said one of the needle beds according to the positional relationship between the first carrier and the second carrier which is obtained by the identifying means.

3. The knit simulation device according to claim 2, wherein the determining means determines the presence or absence of putting round of the second yarn when the new knitted loop is the first knitted loop of a new knitting course of the first yarn fed from the first carrier.

4. The knit simulation device according to claim 2, further comprising:

a color monitor for displaying an image of the knitted fabric obtained in the simulation; and confirmation means for applying a mark onto the color monitor or movably displaying the just previously knitted loop independently of the missed yarn located in the position of the just previously knitted loop, so that a user can identify the presence or absence of putting round.

5. A computer-implemented knit simulation method for simulating a result of knitting operations using knit data for a flat-knitting machine having at least a pair of needle beds and carriers that respectively feed yarns to needles of the needle beds and move upper portions of the needle beds in parallel with the needle beds, wherein, when a new knitted loop is formed by a needle of one of the needle beds using a first yarn fed from a first carrier of the carriers in an area on a knitted fabric in which separate knitted loops are formed by separate yarns fed respectively from the carriers, in order to determine whether a second yarn fed from a second carrier out of the carriers is put round or not, the knit simulation method comprises the steps of:

obtaining at one or more computer processors a relationship between a near and a far side of the first carrier and the second carrier as seen from said one of the needle beds; and determining at one or more computer processors, based on said obtained relationship and an order of knitting in the knitted fabric area, whether the other yarn is put round.

6. The knit simulation method according to claim 5, wherein the determining step determines that the second yarn is put round when, at a position of a just previously knitted loop, the second yarn is missed after the just previously knitted loop is formed, and when the missed yarn is located farther than the one previously knitted loop as seen from said one of the needle beds and the first carrier is located farther than the second carrier as seen from said one of the needle beds according to the positional relationship between the first carrier and the second carrier which is obtained by the identifying step.

7. The knit simulation method according to claim 6, wherein the determining step determines the presence or absence of putting round of the second yarn when the new knitted loop is the first knitted loop of a new knitting course of the first yarn fed from the first carrier.

8. The knit simulation method according to claim 6, further comprising:

a color monitor for displaying an image of the knitted fabric obtained in the simulation; and a confirmation step of applying a mark onto the color monitor or movably displaying the one previously knitted stitch independently of the missed yarn located in the position of the just previously knitted loop, so that a user can identify the presence or absence of putting round.

9. A computer-readable medium having encoded with a data structure for simulating on knit data a result of knitting operations performed using the knit data for a flat-knitting machine having at least a pair of needle beds and carriers that respectively feed yarns to needles of the needle beds and move upper portions of the needle beds in parallel with the needle beds, wherein, when a new knitted loop is formed by a needle of one of the needle beds using a first yarn fed from a first carrier of the carriers in an area on a knitted fabric in which separate knitted loops are formed by separate yarns fed respectively from the carriers, in order to determine whether a second yarn fed from a second carrier out of the carriers is put round or not, the data structure comprising:

an identifying instruction for obtaining a relationship a near and a far side of between the first carrier and the second carrier as seen from said one of the needle beds; and a determining instruction for determining, based on said obtained relationship and an order of knitting in the knitted fabric area, whether the second yarn is put round.

10. The knit simulation program according to claim 9, wherein the determining instruction determines that the second yarn is put round when, at a position of a just previously knitted loop, the second yarn is missed after the just previously knitted loop is formed, and when the missed yarn is located farther than the just previously knitted loop as seen from said one of the needle beds and the first carrier is located farther than the second carrier as seen from said one of the needle beds according to the positional relationship between the first carrier and the second carrier which is obtained by the identifying instruction.

11. The knit simulation program according to claim 10, wherein the determining instruction determines the presence or absence of putting round of the second yarn when the new knitted loop is the first knitted loop of a new knitting course of the first yarn fed from the first carrier.

\* \* \* \* \*